Aug. 2, 1960     W. E. ALTMANN     2,947,396
SYNCHRONIZED CLUTCH

Filed April 25, 1955     5 Sheets-Sheet 1

INVENTOR
WERNER E. ALTMANN
BY Dicke and Craig
ATTORNEYS

Aug. 2, 1960    W. E. ALTMANN    2,947,396
SYNCHRONIZED CLUTCH
Filed April 25, 1955    5 Sheets-Sheet 2
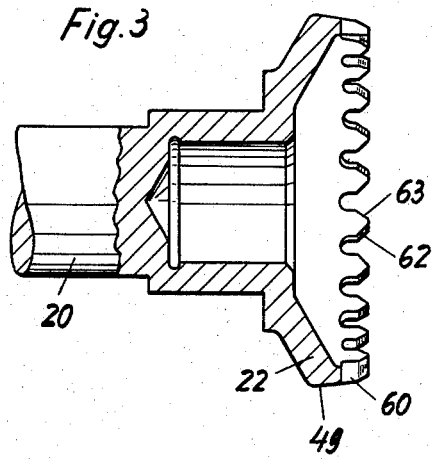
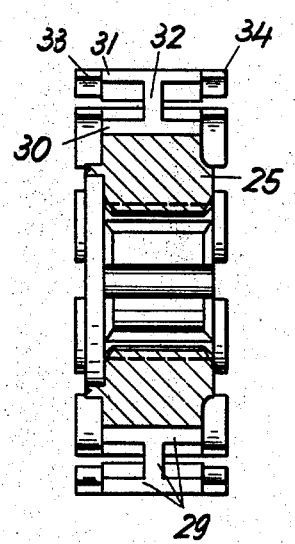
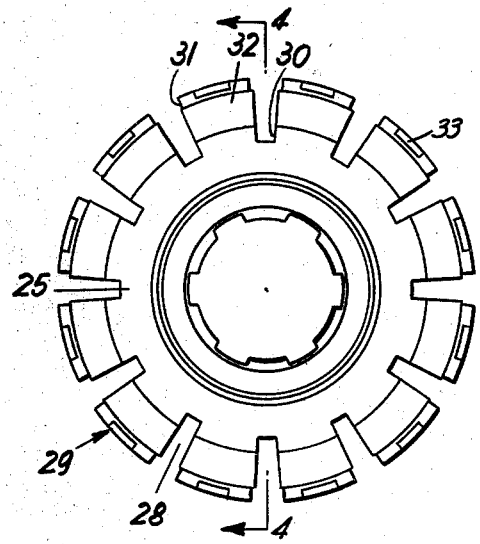
INVENTOR
WERNER E. ALTMANN
BY *Dicke and Craig*
ATTORNEYS

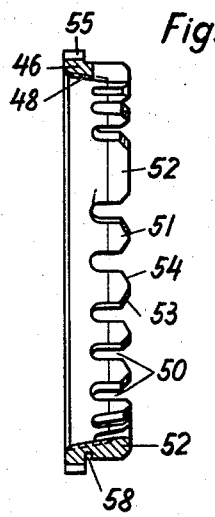
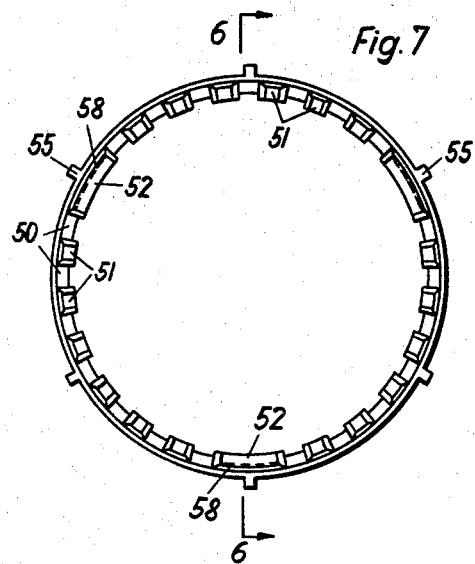
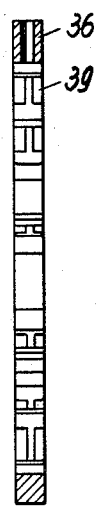
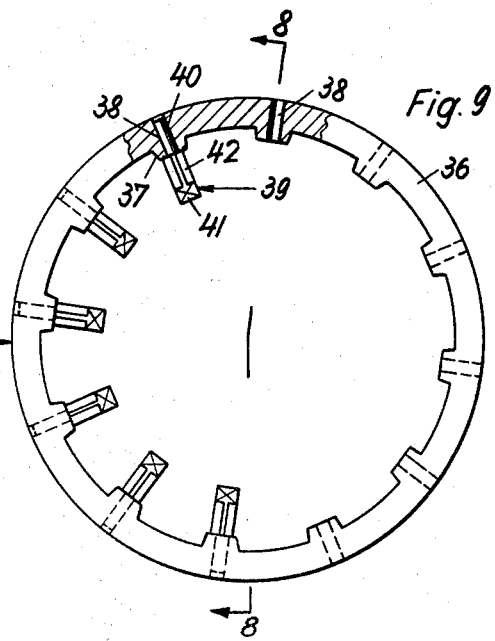

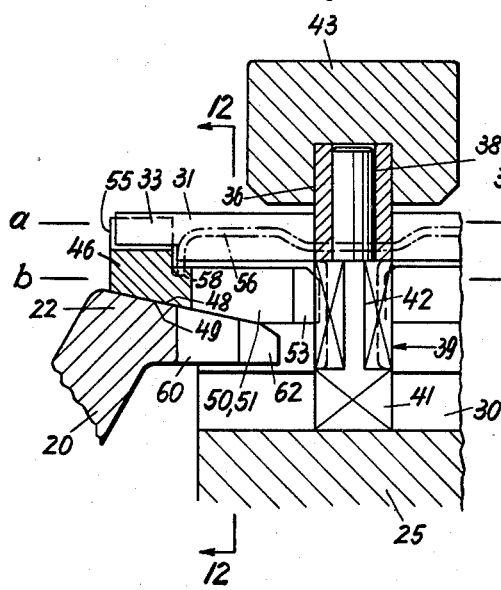
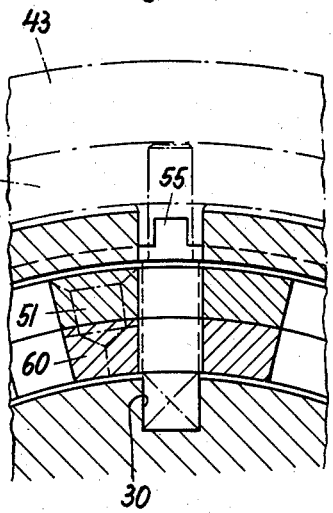
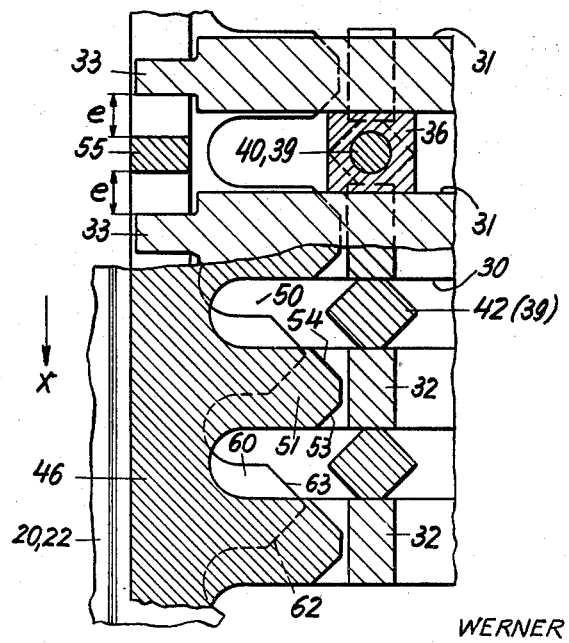

Aug. 2, 1960 W. E. ALTMANN 2,947,396
SYNCHRONIZED CLUTCH
Filed April 25, 1955 5 Sheets-Sheet 5
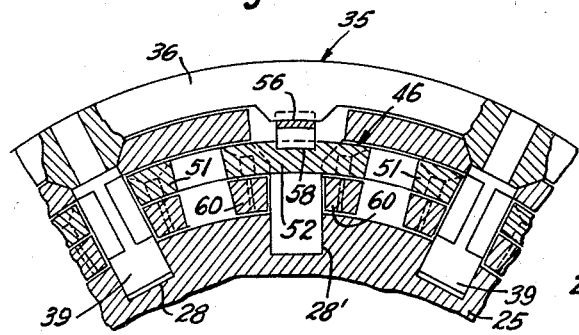
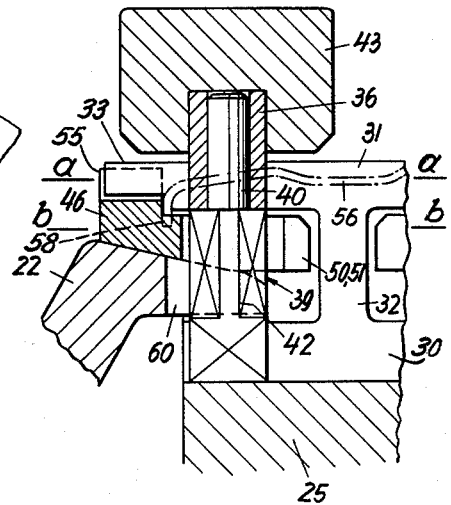
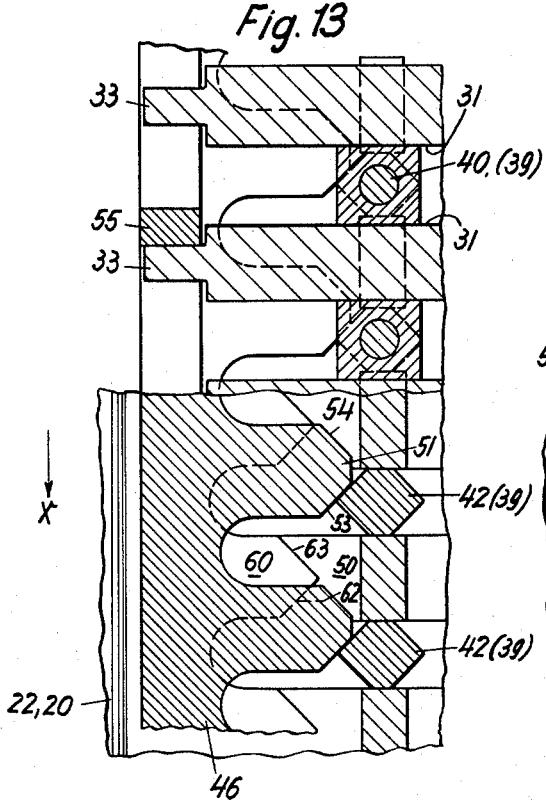
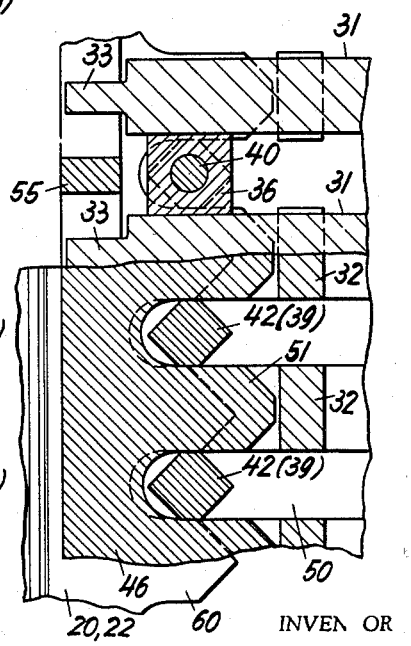
INVENTOR
WERNER E. ALTMANN
BY Dicke and Craig
ATTORNEYS.

United States Patent Office 2,947,396
Patented Aug. 2, 1960

2,947,396

SYNCHRONIZED CLUTCH

Werner E. Altmann, Stuttgart-Unterturkheim, Germany, assignor to Daimler-Benz Aktiengesellschaft, Stuttgart-Unterturkheim, Germany Filed Apr. 25, 1955, Ser. No. 503,562

Claims priority, application Germany Apr. 27, 1954

23 Claims. (Cl. 192—53)

The present invention relates to a claw coupling or clutch and a device for synchronizing the members of such a clutch which are to be brought into axial engagement with each other.

It is an object of the present invention to provide a synchronizing or locking device which may be engaged with one of the clutch members so as to allow it to turn to a limited extent in a peripheral direction thereof, and may be brought into frictional engagement with the other clutch member.

Another object of the present invention is to provide a synchronizing device which permits the claw members of the clutch to be engaged in only one certain rotary position of the device with the other clutch member.

Former synchronizing devices of this general type, especially when combined with shiftable claw couplings or clutches, always required considerable length due to the fact that the claws of the clutch members, as well as the parts of the locking or synchronizing device had to be arranged side-by-side in the axial direction of the clutch.

It is therefore another object of the present invention to provide a synchronizing clutch which excels by its short length and compact design and, particularly, when used in connection with a gear transmission, allows the entire unit to be of light weight and requiring very little space.

Another object of the present invention is to provide a claw clutch wherein the claws of the clutch members which are to be engaged with each other are provided within the synchronizing device.

A further object of the present invention is to provide a clutch, wherein the claws of one clutch member are shaped in the form of radially extending studs which may be brought into engagement with axially extending recesses or notches in the other clutch member.

According to the invention, these studlike claw elements are preferably provided on the shiftable member of the clutch. In order to permit these studlike elements to penetrate inwardly, the present invention further provides an intermediate clutch member which is coupled with the slidable clutch member and provided with a series of notches extending in an axial direction.

The teeth of the synchronizing member which prevent the engagement of the clutch as long as the two parts thereof are not running at the same speed are preferably provided radially outside of the claw teeth of the clutch member which may be engaged therewith by frictional contact. Furthermore, the projecting portions between the axial notches of the intermediate clutch member which are adapted to receive the studlike claw members are preferably made of a substantially I-shaped cross section, and the teeth, both of the synchronizing member, as well as the clutch member, which may be connected therewith by friction are adapted to engage radially with each other between the parallel notches of the intermediate clutch member so that the studlike claw members which are axially slidable within the inner and outer slot may enter into the gaps between these two sets of teeth.

When applying the studlike claw members to a shift clutch, they preferably serve for coupling the central intermediate clutch member both with one as well as the other outer clutch member. Such arrangement has the advantage of resulting in a unit of very compact design and short length.

Further objects, features, and advantages of the present invention will appear from the following detailed description thereof and the accompanying drawings, in which Fig. 1 shows a longitudinal section through a clutch and the synchronizing device according to the invention, the section being taken along line 1—1 of Fig. 2;

Fig. 3 shows a cross section through the non-shiftable clutch member which is secured to the drive shaft;

Fig. 4 shows a cross section, as seen on line 4—4 of Figure 5, through the gear member which is to be engaged with the drive shaft and secured to the driven shaft, and forms the mounting element for carrying the shiftable clutch member;

Fig. 5 shows an elevation of the gear member shown in Fig. 4;

Fig. 6 shows a cross section through one of the synchronizing members, taken along line 6—6 of Fig. 7;

Fig. 7 shows an elevation of the same member;

Fig. 8 shows a cross section through the control ring which serves as a shiftable clutch member, such section being taken along line 8—8 of Fig. 9;

Fig. 9 shows an elevation of the control ring, such view illustrates, at the left side of the figure, the ring with stud-like claw inserts, while the right side shows the ring without such claw members;

Fig. 10 is a partial cross section through the synchronizing device as shown in Fig. 1 but on an enlarged scale with the shiftable clutch member in the central position;

Fig. 11 shows a top view of the device in the position shown in Fig. 10, such view being cut away in the upper portion of the figure to show a section taken along line a—a of Fig. 10, while the lower portion is cut away as to show a section taken along line b—b of Fig. 10;

Fig. 12 shows a section taken along line 12—12 of Fig. 10;

Fig. 13 shows a top view of the control mechanism, such view being illustrated similar to Fig. 11 with an upper part cut away in the manner corresponding to the upper part of Fig. 11 and with a lower part of the figure cut away in a manner corresponding to the lower part of Figure 11, but illustrating the device at the beginning of the engaging movement and during the synchronizing process;

Fig. 14 shows a vertical section through the synchronizing device according to Fig. 10 but with the clutch in the engaged position;

Fig. 15 shows a top view of the synchronizing device in the position shown in Fig. 14 and cut away at two different levels similar to the illustration in Fig. 11; and Figure 16 is a partial transverse section as seen generally on line 12—12 of Figure 10, but in the direction opposite from the arrows, and illustrating a different portion of the clutch structure, angularly spaced from the portion in Figure 12, and showing the positioning springs which interconnect the axially slidable clutch member with the synchronizing ring structure.

Figure 1:
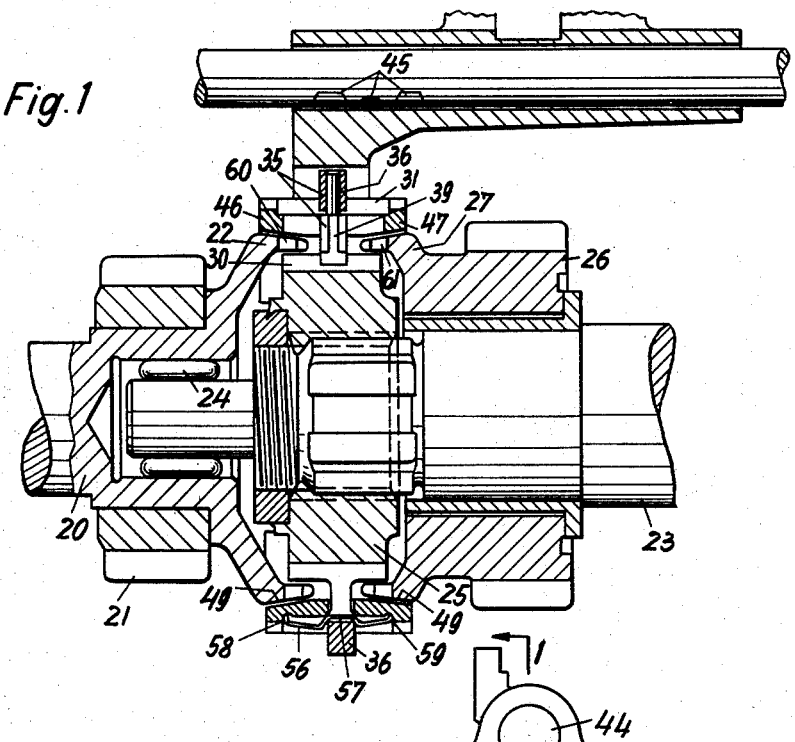
Figure 2:
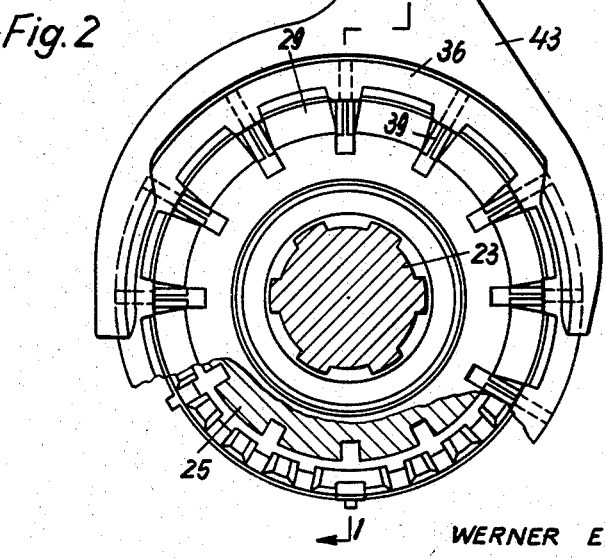
Fig. 2 shows a view in axial direction upon the synchronizing device.

Referring to the drawings, and first particularly to Fig. 1, the drive shaft 20 has securely mounted thereon a gear 21 and extends into a clutch member 22, which preferably forms a unitary part of the drive shaft 20. The driven shaft 23 is rotatably mounted within an axial socketlike recess of the drive shaft 20, for example, by means of needle bearings 24. Shaft 23 carries, on the one hand, an intermediate clutch member 25 which is rigidly mounted thereon and serves as a support for carrying the slidable clutch member 35, while, on the other hand, shaft 23 carries a gear 26 which is mounted thereon so as to be rotatable but nonslidable relative thereto. Gear 26 is secured to and preferably forms a unitary part of a second clutch member 27, and may be engaged with the clutch member 22 by means of the intermediate clutch member 25. Gears 21 and 26 are in engagement with other gears of a gear transmission or the like, not shown in the drawings, in a manner known as such.

As illustrated particularly in Figs. 4 and 5, the intermediate clutch member 25 is provided along its periphery with notches 28, thus leaving intermediate projecting portions 29. Within the area of the notches 28, these projecting portions 29 have a substantially I-shaped cross section so as to form radial guiding surfaces 30 separated by the longitudinal notches 28 as well as similar separate radial guiding surfaces 31, such surfaces or portions being interconnected by central webs 32. The outer guiding surfaces 31 are extended toward both sides beyond the inner guiding surfaces 30 which merge directly with the hub, and these extended end portions 33 and 34 are slightly recessed on their inner sides.

The slidable clutch member 35 illustrated in detail in Figs. 8 and 9 is slidably fitted over the intermediate clutch member 25 as just described. Clutch member 35 consists of a ring 36 which is provided on its inner side with individual projections 37 of a width corresponding in a peripheral direction to the width of the notches 28 in the intermediate clutch member 25 at the radially outer end thereof intermediate the guiding surfaces 31. The ring 36 is further provided with a series of bores 38 extending through the projections 37. Studlike claw members 39 are solidly fixed in the bores 38 by means of cylindrical pins 40 thereon. The ring 36 together with the stud-like claw members 39 define a relatively flat disk-like structure which has very short length axially of the clutch whereby the respective clutch members 22 and 27 which are engaged thereby may be relatively closely spaced to reduce the overall length of the clutch. The inwardly projecting ends 41 of the claw members 39 are of rectangular cross section while the central portion 42 thereof is inclined toward both sides as shown, for example, in Fig. 11b. The inner ends of the central portion 42 of the claw studs 39 may engage radially from the outside into the longitudinal notches 28 between the guiding surfaces 30 and 31 of the intermediate clutch member 25, and thus the studs 39 act as driving elements which engage the shiftable clutch member 35 with the intermediate member 25 and consequently with the driven shaft 23 so as to transmit the driving force thereto.

For shifting the clutch member 35 in the axial direction, a yoke 43 may be provided which is slidable by means of a clutch control lever on the rod 44 which is mounted on the gear housing. If desired, the respective end positions of such movement of the yoke 43 may be fixed by suitable stops or notches 45 as indicated in Fig. 1.

For synchronizing the two clutch members and shafts, synchronizing members 46 and 47 are provided, as shown in detail in Figs. 6 and 7. These members have inner conical surfaces 48 which are adapted to engage by friction with corresponding conical surfaces 49 provided on the clutch members 22 and 27, respectively, as shown in Fig. 1. By the provision of a series of notches 50 at one face of the synchronizing members 46 and 47 which extend radially toward the central transverse plane of symmetry of the clutch, coaxially projecting claw teeth 51 and 52 are formed. The projecting ends of these teeth are pointed on both sides so as to form wedge surfaces 53 and 54 which are adapted to cooperate and engage with the corresponding wedge surfaces of the pointed portion 42 of the claw studs 39. Along the outer periphery of the members 46 and 47 a plurality of radially extending teeth 55 are provided which are adapted to engage in recesses between the coaxial projections 33 or 34, respectively, of the outer guiding surfaces 31 of the intermediate clutch member 25, but so as to have a certain amount $e$ of peripheral play on either side of the teeth 55 relative to the projections 33, as shown in Fig. 11.

The synchronizing member 46 is connected for axial movement with the slidable clutch member 35 by means of a series of pressure members, preferably leaf springs 56, the central portion 57 of which is bent inwardly, as seen in Figure 10, and engages with the inner surface of the ring 36, partially encompassing the same, while their outer ends engage in corresponding recesses 58 and 59, in the synchronizing members 46 and 47, respectively, that is, within the area of the claw teeth 52 which are of considerable width in a peripheral direction. As seen in Figure 7 there are three uniformly spaced teeth 52 and the mounting of the spring 56 as it is seen axially of the clutch is illustrated in Figure 16. At each of the inner projections on the ring 36 opposite the wide teeth 52, the claw studs 39 are omitted thus leaving a space, through which the spring 56 extends in an axial direction, between the opposed surfaces of a notch 28' near the outer periphery of the intermediate clutch member 25. The inwardly bent portion of the spring 56 grips the ring 36 to transfer axial movement of the latter to the synchronizing members 46 and 47 to move them into frictional engagement with the clutch members 22 and 27, respectively. The ring 36 may move further axially relative to spring 56, as seen in Figure 14, after it is synchronized when the studs 39 engage the clutch member 22.

The teeth 51 and 52 of the annular synchronizing members 46 and 47 engage in an axial direction in the annular recesses intermediate the guiding surfaces 30 and 31 of the intermediate clutch member 25, that is, at a point radially outside of the claw teeth 60 and 61 of the non-slidable clutch members 22 and 27, respectively, so that, progressing from the inside toward the outside, the guiding surface 30, the claw teeth 60 and 61 of the non-slidable clutch members 22 and 27, respectively, the teeth 51 and 52 of the synchronizing members 46 and 47, respectively, and the outer guiding surface 31 are disposed one above the other, as shown in Fig. 10. The axially projecting claw teeth 60 and 61 also cooperate and engage on both sides by means of wedge-shaped surfaces 62 and 63 with the wedge surfaces of the pointed-edge part 42 of the studlike claw members 39, as shown in the lower portion of Figure 11. The claw tips of the teeth 60 and 61 point or face generally toward the rotating path of the axially movable clutch member 35 when the latter is in its intermediate disengaged station.

The manner of operation of the synchronizing device according to the invention is best illustrated in Figs. 10 to 15 which show the left side of the synchronizing clutch as shown in an assembled condition in Fig. 1, on an enlarged scale.

Figs. 10 to 12 illustrate the claw clutch in its neutral central position. The slidable clutch member 35 consisting of the ring 36 and the claw members 39 is located in the central position of symmetry of the clutch, while the synchronizing rings 46 are freely rotatable substantially without any friction and with their teeth 55 engaging between the ends 33 of the guiding portions 31 with a free play $e$ on either side, as seen in Figure 11.

For coupling the driven shaft 23 with the drive shaft 20, the yoke 43 is shifted toward the left so as to shift the clutch member 35 with the ring 36 and the claw members 39 in the same direction. Such a shifting movement has first the effect that the springs 56, one of which is indicated in Fig. 10 in dot-and-dash lines, will force the conical surface 48 of the synchronizing member 46 due to axial movement thereof against the conical surface 49 of the clutch member 22 and thus frictionally engage the ring 46 with the drive shaft 20. If the drive shaft 20 moves relative to the driven shaft 23 in the direction shown by the arrow x in Fig. 11, it thus takes along the synchronizing member 46 in the same direction until the teeth 55 engage the projections 33 of the outer guiding surfaces or portions 31 of the intermediate clutch member 25 as shown in the upper portion of Figure 13. When the claw members 39 are being further shifted, the inclined surfaces of the portion 42 thereof will abut against the inclined surfaces 53 of the teeth 51 of the synchronizing member 46 which is taken along with a strong torque by the drive shaft 20 in the direction of rotation x, and thereby prevents any further axial shifting movement of the claw members 39 toward the left. Such engaged position of the claw members 39 or their inclined surfaces 42 with the inclined surfaces 53 of the teeth 51 of the synchronizing member 46 is illustrated in Fig. 13.

The effectiveness of the synchronization of the driving and driven elements depends upon the strength of the springs 56 and the resilient engagement thereof with the slidable clutch member 35 and the ring 36 and the claw members 39 thereof. As soon as the drive shaft 20 and the driven shaft 23 run at the same speed, the torque acting upon the synchronizing member 46 ceases and the claw members 39 of the slidable clutch member 35 may by a further movement of the shift yoke 43 be further shifted in an axial direction to the left. As a result, the springs 56 are disengaged from the ring 36 of the shiftable clutch member 35 which now rides over the portions of the springs 56 which are inclined radially inwardly, while the synchronizing member 46 which is thereby released to move axially in a direction opposite to that of the ring 36, may now turn relative thereto by the inclined surfaces of the claw members 39 in a direction opposed to that shown by the arrow x, so that the claw members 39 may enter into the notches 50 between the claws 51 or 52, respectively, of the synchronizing member 46. Since the claw teeth 60 are pointed in shape by means of the inclined surfaces 62 and 63, the claw members 39 may also be brought into engagement with the teeth 60 of the non-shiftable clutch member 22 since the teeth of both members when engaging each other will cause the clutch member 22 to turn in a peripheral direction until the fully engaged position of the clutch as shown in Figs. 14 and 15 will be obtained.

For disengaging the engine and gear transmission from each other while the claw clutch according to the invention is being operated, it may be advisable to provide an additional main clutch which is capable of being disengaged. However, a non-disengageable fluid clutch, slipping clutch, or the like, may also be provided in place thereof.

Furthermore, it is not absolutely essential that the synchronization of the elements to be coupled be carried out at the claw clutch itself. If desired, the device according to the invention may also be applied in such a manner that the synchronizing member only carries out a locking action while the synchronization as such is carried out at the engine, for example, by regulating the fuel supply by means of a choke or the like. In such event it will be unnecessary to point or taper the individual claw teeth.

Although my invention has been illustrated and described with reference to the preferred embodiments thereof I wish to have it understood that it is in no way limited to the details of such embodiments or to the specific examples described, but is capable of numerous modifications within the scope of the appended claims.

Having thus fully disclosed my invention, what I claim is:

1. A clutch comprising, in combination, a first clutch member, a second clutch member, said two clutch members being relatively axially movable to engage one another, a synchronizing member, means connecting said second clutch member with said synchronizing member so as to allow a limited relative rotary movement between said last-named two members in a peripheral direction thereof, means for frictionally engaging said first clutch member with said synchronizing member, means on said synchronizing member for permitting said two clutch members to engage in one relative rotary position of said synchronizing member relative to said second clutch member, but preventing the same from engaging in another relative position when said two clutch members have a different peripheral speed, said first clutch member having axial projections and axial recesses therebetween, said second clutch member comprising a ring member with stud-like radial projections extending inwardly therefrom, an intermediate clutch member having radially open axial slots, said second clutch member engaging said intermediate clutch member by means of said radial projections engaging said slots so as to allow an axial movement of said second clutch member relative to said intermediate clutch member, but preventing a relative peripheral movement between said two last-named clutch members, said intermediate clutch member being provided with radially extending projecting portions having a substantially I-shaped cross section, said axial slots being located intermediate said projecting portions, said synchronizing member having a series of teeth adapted to prevent said first and second clutch members from engaging when not rotating at the same speed, the teeth of said synchronizing member and the axial projections of said first clutch member, which is adapted to be frictionally engaged therewith, being radially disposed one above the other, said radial projections being adapted to slide axially into the gaps between the axial projections of said first clutch member and the teeth of synchronizing member.

2. A clutch comprising, in combination, a first clutch member, a second clutch member, said two clutch members being relatively axially movable to engage one another, a synchronizing member, means connecting said second clutch member with said synchronizing member so as to allow a limited relative rotary movement between said last-named two members in a peripheral direction thereof, means for frictionally engaging said first clutch member with said synchronizing member, means on said synchronizing member for permitting said two clutch members to engage in one relative rotary position of said synchronizing member relative to said second clutch member, but preventing the same from engaging in another relative position when said two clutch members have a different peripheral speed, said first clutch member having axial projections and axial recesses therebetween, said second clutch member comprising a ring member with stud-like radial projections extending inwardly therefrom, an intermediate clutch member having radially open axial slots, said second clutch member engaging said intermediate clutch member by means of said radial projections engaging said slots so as to allow an axial movement of said second clutch member relative to said intermediate clutch member, but preventing a relative peripheral movement between said two last-named clutch members, said intermediate clutch member including stops for limiting the rotation of said synchronizing member relative to said second clutch member which is connected therewith, said stops being formed by the portions of said intermediate member intermediate said axial slots, said portions having axially extending projections, said synchronizing member having radially extending projections, said projections on said intermediate member being adapted to engage with said limited rotary movement in peripheral direction between said radial projections of said synchronizing member.

3. A clutch comprising, in combination, a first clutch member, a second clutch member, said two clutch members being relatively axially movable to engage one another, a member coaxial with said second clutch member for supporting the latter to move axially relative to said first clutch member, a synchronizing member, means connecting said second clutch member with said synchronizing member so as to allow a limited relative rotary movement between said last-named two members in a peripheral direction thereof, means for frictionally engaging said first clutch member with said synchronizing member, means on said synchronizing member for permitting said two clutch members to engage in one relative rotary position of said synchronizing member relative to said second clutch member, but preventing the same from engaging in another relative position when said two clutch members have a different peripheral speed, said first clutch member having axial projections and axial recesses therebetween, said second clutch member comprising a ring member with stud-like radial projections extending inwardly therefrom to define a substantially flat structure of short axial length to facilitate reduction in the overall length of the clutch, said radial projections adapted to engage said axial recesses on said first clutch member, to transmit a rotary motion between said two clutch members, said axial projections and recesses on said first clutch member being located radially inwardly of said means for frictionally engaging said first clutch member with said synchronizing member.

4. A clutch as defined in claim 3, wherein at least one of the radial projections, the teeth of said synchronizing member and the teeth of the first clutch member which is adapted to be frictionally engaged therewith has inclined surfaces, said inclined surfaces adapted to permit a relative rotation and an axial movement of said second clutch member with respect to said synchronizing member and said first clutch member when said clutch members run in synchronism.

5. A combination according to claim 3, wherein said means on said synchronizing member are engageable with said radial projections of said second clutch member.

6. A clutch comprising, in combination, a first clutch member, a second clutch member, said two clutch members being relatively axially movable to engage one another, a synchronizing member, means connecting said second clutch member with said synchronizing member so as to allow a limited relative rotary movement between said last-named two members in a peripheral direction thereof, means for frictionally engaging said first clutch member with said synchronizing member, means on said synchronizing member for permitting said two clutch members to engage in one relative rotary position of said synchronizing member relative to said second clutch member, but preventing the same from engaging in another relative position when said two clutch members have a different peripheral speed, said first clutch member having axial projections and axial recesses therebetween, said second clutch member comprising a ring member with stud-like radial projections extending inwardly therefrom to define a substantially flat structure of short axial length to facilitate reduction in the overall length of the clutch, an intermediate clutch member having radially open axial slots, said second clutch member engaging said intermediate clutch member by means of said radial projections engaging said slots so as to allow an axial movement of said second clutch member relative to said intermediate clutch member, but preventing a relative peripheral movement between said two last-named clutch members.

7. A combination according to claim 6, wherein said means on said synchronizing member are engageable with said radial projections of said second clutch member.

8. A clutch comprising, in combination, a first clutch member, a second clutch member, a third clutch member, said second clutch member being axially movable and alternately engageable with said first and said third clutch members, a first synchronizing member, a second synchronizing member, means for selectively connecting said second clutch member with said synchronizing members so as to allow a limited relative rotary movement between each of said synchronizing members and said second clutch member in a peripheral direction thereof, means for frictionally engaging said first clutch member with said first synchronizing member and said third clutch member with said second synchronizing member, means on said first and second synchronizing members for permitting said first clutch member and said second clutch member to engage in one relative rotary position of said first synchronizing member relative to said second clutch member and for permitting said third clutch member and said second clutch member to engage in one relative rotary position of said second synchronizing member relative to said second clutch member, but preventing the same from engaging in another relative position when said first clutch member or said third clutch member have a different peripheral speed from that of said first synchronizing member and said second synchronizing member respectively, said first and third clutch members having axial projections and axial recesses therebetween, said second clutch member comprising a ring member with stud-like radial projections extending inwardly therefrom to define a substantially flat structure of short axial length to facilitate reduction in the overall length of the clutch, said radial projections being adapted to alternately engage said axial recesses on said first and third clutch member to alternately transmit a rotary motion between said first clutch member and said second clutch member, and between said third clutch member and said second clutch member, said axial projections and recesses of said first and third clutch members being located radially inwardly of said means for frictionally engaging said first clutch member with said first synchronizing member and said third clutch member with said second synchronizing member.

9. A clutch comprising, in combination, a first clutch member, a second clutch member, a third clutch member, said second clutch member being axially movable and alternately engageable with said first and said third clutch member, a first synchronizing member, a second synchronizing member, means for selectively connecting said second clutch member with said synchronizing members so as to allow a limited relative rotary movement between each of said synchronizing members and said second clutch member in a peripheral direction thereof, means for frictionally engaging said first clutch member with said first synchronizing member and said third clutch member with said second synchronizing member, means on said first and second synchronizing members for permitting said first clutch member and said second clutch member to engage in one relative rotary position of said first synchronizing member relative to said second clutch member and for permitting said third clutch member and said second clutch member to engage in one relative rotary position of said second synchronizing member relative to said second clutch member, but preventing the same from engaging in another relative position when said first clutch member or said third member has a different peripheral speed from that of said first synchronizing member and said second synchronizing member respectively, said first and third clutch members having axial projections and axial recesses therebetween, said second clutch member comprising a ring member with stud-like radial projections extending inwardly therefrom in a plane of said ring member, an intermediate clutch member having radially open axial slots, said second clutch member engaging said intermediate clutch member by means of said radial projections engaging said slots so as to allow an axial movement of said second clutch member relative to said intermediate clutch member, but preventing a relative peripheral movement between said two last-named clutch members.

10. A combination according to claim 9, wherein said means on said first and second synchronizing members are selectively engageable with said radial projections of said second clutch member.

11. A clutch comprising, in combination, a first clutch member, a second clutch member, a third clutch member, said second clutch member being arranged essentially between said first and said third clutch member and including a ring member with stud-like claw elements extending radially inwardly from said ring member and in the plane thereof, first axially directed claw elements on said first clutch member having tips facing in a first direction toward said third clutch member, second axially directed claw elements on said third clutch member having tips facing in the opposite direction toward said first clutch member, said first and said second claw elements, on the one hand, and said stud-like claw elements, on the other, being axially movable relative to each other in such a way that upon selective axial displacement either said first claw elements or said second claw elements may be brought into engagement with said stud-like claw elements, said ring member and said stud-like claw elements defining a relatively flat structure of small axial extent whereby said first and third claw elements are closely spaced on opposite sides of said flat structure when the latter is in an intermediate disengaged station.

12. A clutch comprising, in combination, a first clutch member, a second clutch member, said second clutch member including a ring member with stud-like claw elements extending radially inwardly from said ring member, said first clutch member including axially directed claw elements, said stud-like claw elements and said axially directed claw elements being movable relative to each other in an axial direction for operative engagement with each other, an intermediate clutch member, said stud-like claw elements being in slidable engagement, axially of the clutch, with said intermediate clutch member at one distance from the axis of rotation of said clutch and having portions movable into operative engagement with said axially directed claw elements at another distance from said axis of rotation, said ring member and said stud-like claw elements defining a relatively flat structure of small axial extent whereby the length of the clutch in its disengaged station is minimized.

13. A clutch member comprising, in combination, a first clutch member, a second clutch member, a third clutch member, said second clutch member being arranged essentially between said first and said third clutch member and including a ring member with stud-like claw elements extending radially inwardly from said ring member, first axially directed claw elements on said first clutch member having tips facing in a first direction toward said third clutch member, second axially directed claw elements on said third clutch member having tips facing in the opposite direction toward said first clutch member, said first and said second claw elements, on the one hand, and said stud-like claw elements, on the other, being axially movable relative to each other in such a way that upon selective axial displacement either said first claw elements or said second claw elements may be brought into engagement with said stud-like claw elements, an intermediate clutch member, said stud-like claw elements being in slidable engagement with said intermediate clutch member at one distance from the axis of rotation of said clutch and having portions movable into operative engagement with said axially directed claw elements at another distance from said axis of rotation, said ring member and said stud-like claw elements defining a relatively flat structure of small axial extent whereby said first and third claw elements are closely spaced on opposite sides of said flat structure when the latter is in an intermediate disengaged station.

14. A clutch comprising in combination, first and second coaxial mutually-engageable rotatable clutch members, said first clutch member including axially projecting claw elements, said second clutch member being generally disk-like in shape and having a plurality of radially extending stud-like elements defining a portion of said disk-like shape, said second clutch member being supported for axial movement relative to said first clutch member between engaged and disengaged positions, said axially projecting claw elements having tips facing toward a path of rotary movement of said radially extending stud-like elements when the clutch members are disengaged and said radially extending stud-like elements being meshed in driving relationship with said axially projecting claw elements in said engaged position, said second clutch member including radially extending portions also defining part of its disk-like shape but disposed further radially inwardly of said second clutch member than the portions thereof engageable with said axially projecting claw elements, and a rotatable hub-like structure coaxial with and axially slidably supporting said second clutch member and connected in rotary driving engagement with said inner radially extending portions of said second clutch member, and means rigidly connecting said radially extending stud-like elements and said inner portions together for rotation as a unit and defining therewith said disk-like shape whereby the axial extent of said second clutch member is minimized.

15. A clutch according to claim 14, wherein the radially extending stud-like elements are tapered in cross section to facilitate engagement with said axially projecting claw elements.

16. A clutch according to claim 14, wherein said second clutch member is slidable axially on said hub-like structure and the latter includes portions extending radially outwardly therefrom beyond said axially projecting claw elements for guiding said second clutch member in its axial sliding movement.

17. A clutch comprising in combination, first and second coaxially-rotatable mutually-engageable clutch members, said first clutch member including axially projecting claw elements, said second clutch member being generally disk-like in shape and having a plurality of radially extending stud-like elements, means rigidly connecting said radially extending stud-like elements together for rotation as a unit and defining therewith said disk-like shape whereby the axial extent of said second clutch member is minimized, a member coaxial with said second clutch member supporting the latter for axial movement relative to said first clutch member between a first disengaged position in which the tips of said axially projecting stud-like elements point toward a path of rotary movement of said radially extending claw elements and a second engaged position in which position said radially extending stud-like elements are meshed in driving relationship with said axially projecting claw elements, a synchronizing member having a surface movable into frictional driving relationship with a surface on said first clutch member and further having axially projecting elements engageable with other portions of said radially extending stud-like elements of said second clutch member to permit said two clutch members to engage in one relative rotary position of said synchronizing member relative to said second clutch member, but preventing engagement of said clutch members in another relative position of said synchronizing member relative to said second clutch member when said two clutch members have different rotating speed about their axis, and means interconnecting said synchronizing member and said second clutch member for limiting the relative rotary movement therebetween about said axis.

18. A clutch construction according to claim 17, wherein said synchronizing member is located radially outwardly of said first clutch member and is frictionally engageable with an outer surface of the latter.

19. A clutch according to claim 17, wherein said synchronizing means includes a spring means frictionally securing said synchronizing means to said second clutch member, said spring means permitting relative axial movement of said synchronizing means and said second clutch member only upon application of a predetermined axial force therebetween, said synchronizing means being movable into frictional engagement with said first clutch member by axial movement of said spring means in response to axial movement of said second clutch member.

20. A clutch comprising in combination, first, second and third coaxial rotatable clutch members, said second clutch member being generally disk-like in shape, a member coaxial with said second clutch member for supporting it between said first and third clutch members for axial movement relative thereto to engage one or the other thereof, said second clutch member being movable to an intermediate station in which it is disengaged from each of said first and third clutch members, each of said first and third clutch members including axially projecting claw elements having tips facing toward the path of rotary movement of said second clutch member in said disengaged station, said second clutch member having a plurality of radially extending elements defining portions of its disk-like shape and engageable between the claw elements of said first and third clutch members by axial movement of said second clutch member relative thereto, means rigidly connecting said radially extending elements together and defining therewith said disk-like shape whereby the axial extent of said second clutch member is minimized and the distance between said first and third clutch members is only slightly greater than the width, parallel to the clutch axis, of said radially extending elements, synchronizing means disposed on opposite sides of said disk-like second clutch member and having surfaces movable selectively into frictional driving relationship with surfaces on said first and third clutch members respectively, said synchronizing means including axially projecting elements engageable with portions of said radially extending elements of said second clutch member to permit said second clutch member to be engaged with either of said first or third clutch members when in synchronism therewith but preventing such engagement with the selected one of said first and third members when the latter is rotating at a speed different from that of said second clutch member, and means for interconnecting said synchronizing means for rotation with, but with limited rotation with respect to, said second clutch member.

21. A clutch according to claim 20, wherein the means rigidly connecting said radially extending elements is a ring disposed at the outer ends of these elements, said synchronizing means including spring means engaging the ring which connects the stud-like elements and being movable initially with said second clutch member during its movement in either direction from said disengaged station to urge one of said first-mentioned surfaces on said synchronizing means into frictional driving engagement with a respective surface on one of said first and third clutch members, said second clutch member being further movable axially with respect to said spring means upon achieving synchronism with said last-mentioned clutch member.

22. A clutch comprising in combination, first, second and third coaxial rotatable clutch members, said second clutch member being generally disk-like in shape and supported between said first and third clutch members for axial movement relative thereto to engage one or the other thereof, said second clutch member being movable to an intermediate station in which it is disengaged from each of said first and third clutch members, each of said first and third clutch members including axially projecting claw elements having tips facing toward the path of rotary movement of said second clutch member in said disengaged station, said second clutch member having a plurality of radially extending elements defining portions of its disk-like shape and engageable between the claw elements of said first and third clutch members by axial movement of said second clutch member relative thereto, means rigidly connecting said radially extending elements together and defining therewith said disk-like shape whereby the axial extent of said second clutch member is minimized and the distance between said first and third clutch members is only slightly greater than the width, parallel to the clutch axis, of said radially extending elements, synchronizing means disposed on opposite sides of said disk-like second clutch member and having surfaces movable selectively into frictional driving relationship with surfaces on said first and third clutch members respectively, said synchronizing means including axially projecting elements engageable with portions of said radially extending elements of said second clutch member to permit said second clutch member to be engaged with either of said first or third clutch members when in synchronism therewith but preventing such engagement with the selected one of said first and third members when it is rotating at a speed different from that of said second clutch member, means for connecting said synchronizing means for rotation with, but with limited rotation with respect to, said second clutch member, and a hub-like structure coaxial with said clutch members and connected in rotary driving engagement with said second clutch member, said hub-like structure having at least one axially extending radially open slot with at least a portion of said second clutch member extending thereinto to guide relative axial movement of said second clutch member with respect to said hub-like structure.

23. A clutch construction according to claim 22, wherein said hub-like structure includes radially spaced and axially extending guiding surfaces for supporting said second clutch member near the ends of said radially extending elements on radially opposite sides of the portions thereof which are engageable with the claw elements of another clutch member, said surfaces guiding said second clutch member in its axial movement relative to said hub-like structure, and means extending radially between said guide surface portions for interconnecting them on said hub-like structure.

References Cited in the file of this patent

UNITED STATES PATENTS

| | | |
|---|---|---|
| 495,687 | Trethewey | Apr. 18, 1893 |
| 1,471,226 | Whisler | Oct. 16, 1923 |
| 1,913,162 | Keller | June 6, 1933 |
| 2,101,134 | Fawick | Dec. 7, 1937 |
| 2,245,816 | Peterson | June 17, 1941 |
| 2,256,320 | Lapsley | Sept. 16, 1941 |
| 2,369,843 | Neracher et al. | Feb. 20, 1945 |
| 2,392,520 | Benz et al. | Jan. 8, 1946 |